United States Patent [19]
Versnel et al.

[11] 3,922,316
[45] Nov. 25, 1975

[54] PREPARATION OF A BROMINATED FIRE RETARDING AGENT

[75] Inventors: John Versnel, Plainsboro; Lionel T. Wolford, Freehold, both of N.J.

[73] Assignee: Cities Service Oil Company, Tulsa, Okla.

[22] Filed: Aug. 8, 1974

[21] Appl. No.: 495,599

Related U.S. Application Data

[63] Continuation-in-part of Ser. No. 390,668, Aug. 22, 1973, abandoned, which is a continuation-in-part of Ser. No. 130,817, April 2, 1971, abandoned.

[52] U.S. Cl. .............................................. 260/648 C
[51] Int. Cl.² ..................... C07C 17/04; C07C 23/20
[58] Field of Search ..................... 260/648 R, 648 C

[56] References Cited
UNITED STATES PATENTS

| | | | |
|---|---|---|---|
| 2,606,910 | 8/1952 | Herzfeld et al. | 260/648 C |
| 2,952,711 | 9/1960 | Roberts | 260/648 C |
| 3,222,249 | 12/1965 | Koremura et al. | 260/648 C |
| 3,290,359 | 12/1966 | Mark | 260/648 C |
| 3,396,201 | 8/1968 | Weil et al. | 260/648 C |
| 3,415,938 | 12/1968 | Weil et al. | 260/648 C |
| 3,418,384 | 12/1968 | Stapp | 260/648 C |

OTHER PUBLICATIONS

Riemschneider, Monash. Fur Chem. 83, 802–815 (1958).
Ziegler et al., Ann, 589 145, 157–162 (1954).
Fray, J. Chem. Soc. 1963 4284–4285.

*Primary Examiner*—D. Horwitz
*Attorney, Agent, or Firm*—George L. Rushton

[57] ABSTRACT

A fire retarding agent is prepared by reacting a halocyclopentadiene and cyclooctadiene to form Diels-Alder adducts, selectively extracting the monoadduct from the mixture, brominating the monoadduct, and separating the brominated product. The extraction solvent is used as the solvent in the bromination step and can be recycled for the extraction.

4 Claims, No Drawings

PREPARATION OF A BROMINATED FIRE RETARDING AGENT

CROSS-REFERENCE TO RELATED APPLICATION

This application is a continuation-in-part of co-pending application Ser. No. 390,668, filed Aug. 22, 1973, now abandoned, which in turn was a continuation-in-part of co-pending application Ser. No. 130,817 filed Apr. 2, 1971, now abandoned.

BACKGROUND OF THE INVENTION

This application concerns fire retarding agents. More specifically, it relates to fire retarding agents which can be formed by the reaction of a diene, such as a halogenated cyclopentadiene, and a dienophile, such as a cyclic diene. This type reaction is commonly known as a Diels-Alder reaction. More specifically, the application relates to a process for preparing brominated fire retarding agents obtained from the mono-adducts of the above-mentioned Diels-Alder compounds.

Diels-Alder adducts are well known and are reviewed in an article by J. A. Norton in "Chemical Reviews", Vol. 31, page 319 (1942). These adducts can be prepared by simply reacting a diene with a dienophile. When the dienophile contains multiple ethylenic unsaturation, as in the case of cyclooctadiene-1,5, the reaction product generally contains a mixture of 2:1 adducts (derived from 2 moles of diene and 1 mole of dienophile) and the 1:1 adduct (derived from 1 mole of each of the diene and the dienophile). Certain Diels-Alder adducts, such as the above 1:1 adduct, are desirable in pure form since these adducts can be brominated to produce highly effective fire retarding agents.

In the past, such 1:1 adducts were separated from 2:1 and higher adducts by vacuum distillation. While this method of separation is widely used, it is time consuming, requires specialized and expensive equipment, and can lead to the formation of color bodies in the desired product.

The bromination of adducts having residual unsaturation has likewise encountered many difficulties, such as low yields and the formation of products resulting from the reaction of bromine with a reactive solvent system.

SUMMARY OF THE INVENTION

We have discovered a process for preparing a brominated fire retarding agent, which reduces or avoids the difficulties found in prior art processes. Our invention prepares a fire retarding agent having the structure

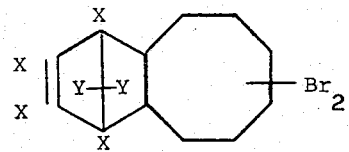

wherein X=halogen, Y is a radical selected from the class consisting of hydrocarbon radicals and halogens, with the hydrocarbon radicals selected from the group consisting of alkyl radicals containing from 1 to 8 carbon atoms, alkoxy radicals containing from 1 to 8 carbon atoms, and monohaloalkyl radicals containing from 1 to 8 carbon atoms comprising in sequence the steps of a. reacting a halocyclopentadiene (or cyclopentadienyl polyhalide) with at least a stoichiometric amount of cyclooctadiene, b. extracting, from a mixture consisting essentially of a monoadduct having the structure selected from

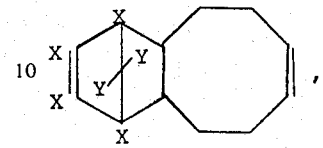

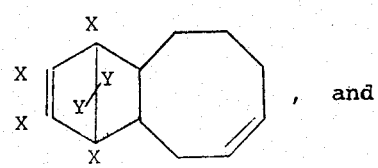

and

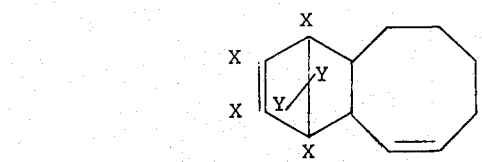

and a di-adduct having the structure selected from

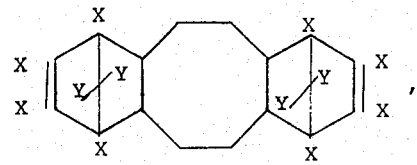

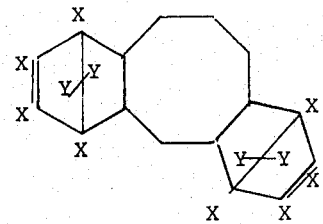

and

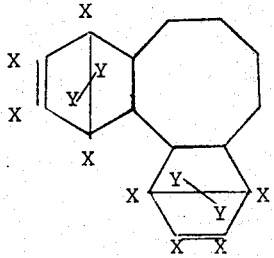

the mono-adduct with a selective liquid organic solvent having a dielectric constant of less than about 30, c. brominating, in the solvent system used in step (b), the mono-adduct with at least a stoichiometric amount of a brominating agent, d. separating the brominated halocyclopentadiene-cyclooctadiene compound, and e. recycling the solvent from step (d) for use in the extraction step (b).

DESCRIPTION OF THE PREFERRED EMBODIMENTS

The cyclopentadienyl polyhalides (or halocyclopentadienes) which can be used in the preparation of the compounds to be brominated must contain at least 2, and most desirably 4, halogen atoms. Such compounds are typically of the formula

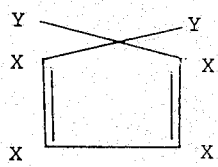

wherein X is a halogen, such as fluorine, chlorine, bromine, or iodine, but preferably chlorine or bromine, and Y is halogen, hydrogen, monohaloalkyl, hydrocarbyl, or hydrocarbyloxy group. Exemplary of such polyhalocyclopentadienes are hexachlorocyclopentadiene, hexabromocyclopentadiene, tetrachlorodibromocyclopentadiene, bromopentachlorocyclopentadiene and also halogenated cyclopentadienes wherein some of the halogen atoms are iodine and/or fluorine, which can be prepared by methods known to the art. The hydrocarbyl or hydrocarbyloxy substituent groups are exemplified by methyl, ethyl, isopropyl, secondary butyl, hexyl, and 2-ethylhexyl, dimethoxy, 2-methoxyethyl and 2-ethoxyhexyl, and monohaloalkyl such as chloromethyl, bis(chloromethyl) and bis(-bromobutyl), with the hydrocarbyl, hydrocarbyloxy, and monohaloalkyl radicals containing from 1 to 8 carbon atoms. The preferred halocyclopentadienes are hexachlorocyclopentadiene and hexabromocyclopentadiene.

Cyclooctadiene is the dienophile used to react with the diene to give the desired adduct which is later brominated. Cyclooctadiene-1,3, cyclooctadiene-1,4, and cyclooctadiene-1,5 are the dienophiles that can be used, with cyclooctadiene-1,5 being the preferred dienophile.

The conditions of reaction between the halocyclopentadienes and the dienophiles are not critical and are dependent upon the nature of the reactants. The reaction temperature can vary from about room temperature up to the reflux temperature of the mixture, with this reflux temperature indicating the lack of a solvent. The reaction of cyclooctadiene and a halocyclopentadiene needs no solvent. If a solvent is used for the reaction, the reflux temperature of the solvent used can be the controlling temperature, assuming a closed system under pressure is not used. The reaction typically takes place at atmospheric pressure, but can be run in a closed system at higher than atmospheric pressure. The ratio of the reactants should be such that there is at least a stoichiometric amount present. It is preferable to have an excess of the dienophile present, to assure complete reaction with the halocyclopentadiene and to minimize the formation of a di-adduct. Thus, the ratio of the dienophile to the halocyclopentadiene can vary from about 1.05 to about 10, with a preferred ratio ranging from about 3 to about 8.

The excess dienophile can be removed prior to extraction of the mono-adduct by any convenient means, such as thermal distillation. Alternatively, the excess dienophile and the desired mono-adduct can be extracted from the higher adduct, with the excess dienophile later being removed from the monoadduct.

The reaction time for the formation of the adduct is that time sufficient for suitable completion of the reaction. Depending upon the temperature employed, the reaction time can vary from about 10 minutes to about 10 hours, with a preferred reaction time of from about 1 to about 5 hours.

The step of extracting the mono-adduct from a mixture of mono- and di-adducts has many parameters. The extraction is effected by the use of a solvent selective for the mono-adduct, that is, one in which the monoadduct is appreciably more soluble than is the di-adduct. To facilitate simple separation and purification, the selective solvent must not react chemically with any of the adducts, must be easily separable from the various adduct portions and be liquid at extraction temperature. Solvents having these desirable properties are organic liquids having a dielectric constant of less than about 30. It is preferred that the organic solvent have a dielectric constant of less than about 20, with outstanding results being obtained by using organic liquid solvents having dielectric constants of less than about 10. An important feature of this invention lies in the dual use of the same solvent (or mixture of solvents) in the extraction step and in the bromination step. And another feature concerns the re-use, by recycling, of the solvent in the complete process.

Of the various organic liquids useful in the process, the following are illustrative: saturated aliphatic and cycloaliphatic hydrocarbons, particularly those having from about 5 to about 12 carbon atoms, such as hexane, pentane, octane, dodecane, cyclohexane, ethylcyclohexane, cyclooctane, and cyclododecane; aromatic hydrocarbons having 6 to 8 carbon atoms, such as benzene and toluene; alkanols having from about 3 to about 12 carbon atoms, such as n-butanol, isooctyl alcohol and lauryl alcohol; aliphatic monocarboxylic acids having from about 2 to about 10 carbon atoms, such as acetic acid, butyric acid and caprylic acid; aliphatic esters having from about 4 to about 16 carbon atoms, such as ethyl acetate, propyl butyrate and n-amyl isocaproate; halogenated aliphatic compounds containing from about 1 to about 8 carbon atoms, such as chloroform, 1,2-dichloropropane, methyl chloroform and chloro-cyclohexane; aliphatic nitriles containing from about 3 to about 8 carbon atoms, such as propionitrile and isocaproic nitrile; aliphatic nitro compounds containing from about 2 to about 6 carbon atoms, such as 1-nitropropane, 2-nitrobutane, and 1-nitrohexane; aliphatic ethers containing from about 4 to about 12 carbon atoms, such as ethyl ether and amyl ether; aromatic derivatives such as o-dichlorobenzene, benzonitrile and methyl benzoate; and heterocyclics such as dioxane and tetrahydrofuran. Of these solvents, those preferred are the above described aromatic hydrocarbons, alkanes, halogenated alkanes, alkanols and mixtures thereof. Single solvents preferred for use in both the extraction and bromination steps are the nitropropanes and halogenated alkanes. The preferred mixed solvents are the aromatic hydrocarbons:alkanols. Illustrative of such a mixture are benzene:t-butyl alcohol. It is found that a selective solvent having a dielectric constant of less than 30 can be mixed with an organic solvent having a dielectric constant of greater than 30 in such proportions that the mixture of solvents has a net dielectric constant of less than 30. This mixture, exemplified by benzene: methyl alcohol, can then be used as a selective solvent to separate the 1:1 adduct from higher adducts and subsequently as a bromination solvent.

As mentioned previously, excess dienophile can be removed before or after extraction by the selective organic solvent. Since the selective organic solvent dissolves the 1:1 adduct in preference to higher adducts, a two-phase system can result. Separation of the solution containing the 1:1 adduct can be done by any of several known means, such as by centrifugation or by filtration.

The solvent extraction can be carried out in a range of temperature. Since solubility, in general, varies directly with temperature, a low extracting temperature can lead to the complications of low solubility of the 1:1 adduct in the solvent and to possible freezing of the solvent, while a high extracting temperature can lead to volatilization of the solvent, along with increased solubility of the higher adducts. Depending on the solvent system used, the temperature of separation can vary from about 0 to about 100°C., with a preferable range of from about 15° to about 60°C. Since, apart from the disadvantages noted above for too high or too low a temperature, the extracting temperature is not critical, room temperature is a convenient processing temperature.

Since, in general, variations in pressure do not appreciably affect solubility, the separating process can be carried out at sub-atmospheric, atmospheric or super-atmospheric pressure. If the pressure is too low, volatilization of the extracting solvent occurs, while carrying out the separation at super-atmospheric pressure imposes the added burden of equipment and expense. Since pressure is not a critical factor for this separation, the process is conveniently carried out at atmospheric pressure.

The relative quantities of the selective organic solvent and the adduct mixture can vary over a wide range. Depending upon factors such as the percent of 1:1 adduct in the mixture and the relative solubility of the 1:1 adduct and the higher adducts in the selected solvent system, the weight ratio of the solvent to the adduct mixture can vary from about 1:10 to about 20:1. A more desirable range is from about 1:5 to about 5:1, while a preferred range is from about 1:1 to about 4:1.

The contact time for the separation is not a critical factor. The selective solvent should be in contact with the admixture long enough to extract the desired component, but a protracted contact time is not necessary. Depending on other factors, such as the temperature and quantity of solvent used, the contact time can vary from about 1 minute to 5 hours, while a more preferred time is from about 5 minutes to about 1 hour.

After the mono-adduct is separated from the mixture, such as by filtering the mono-adduct solution from the insoluble di-adduct, the solution containing the mono-adduct is ready for the bromination step.

Bromine is the most widely known and used brominating agent, but other agents, such as pyridine hydrobromide perbromide, can be used. At least a stoichiometric amount of the brominating agent, relative to the adduct to be brominated, should be used. Typically, an excess of about 5 or 10 wt.% of brominating agent is used to assure complete bromination. If a greater excess is used, unreacted bromine or brominating agent can be carried back by the recycle stream to the adduct separation step, thus possibly forming undesired compounds.

Generally, brominations done in the presence of a non-polar solvent result in substitutive reactions, giving lower yields and undesired brominated products. If brominations are done in the presence of a polar solvent, by-products resulting from the interaction of the solvent with the brominating agent can be formed. We have found that certain mixtures of organic solvents, with the mixture having a net dielectric constant of less than 30, can have 3 functions: they furnish a solvent system that selectively extracts the mono-adduct from a mixture of mono- and di-adducts; they furnish a desirable solvent medium in which bromination of the mono-adduct takes place smoothly, in good yield and with a minimum formation of by-products; and the solvent mixture can be recycled from the bromination reaction to the selective extraction step. Illustrative of such solvent mixtures are hexane:t. butyl alcohol, benzene:nitroethane and benzene: methyl alcohol. Methyl chloroform, chloroform, methylene chloride, nitropropane-1 and nitropropane-2 are useful single solvents that can be used.

The weight ratio of the solvent to the adduct to be brominated can vary. Enough solvent is used to form a solution of the adduct, while a great excess of solvent is wasteful, due to extra-size equipment needed and the necessity of processing large volumes of solution. Typically, the weight ratio of solvent (either a single solvent or a mixture of solvents) to compound to be brominated can vary from about 1:1 to about 10:1, with a range of about 3:2 to about 3:1 being preferred.

The temperature for the bromination reaction can vary, depending upon the solvents used. For example, the temperature can vary from about 20°C. to about 58°C., the boiling point of bromine, the preferred brominating agent. If the bromination temperature is higher than this, pressure vessels, as opposed to open vessels, are required. A preferred range for the bromination reaction is from about 20° to about 55°C, with a temperature range of from about 40° to about 50°C. being most preferred. There should be sufficient agitation to assure good mixing of the reactants, but the agitation should not be so violent as to cause physical loss of the reactants or products.

Depending on the reaction temperatures, the ratio of reactants to solvents, and the adducts being brominated, the reaction time can vary from about ¼ hour to about 6 hours, more desirably from about ½ hour to about 3 hours. The time should be long enough to assure good yields of the desired products, but should not be of such an extended time as to result in inefficient use of the reaction vessels. During a typical bromination reaction, the disappearance of the yellow or red-brown bromine color in the mixture can be taken as a measure of completion of the reaction. We have found that the use of a slight excess of brominating agent during the reaction gives improved yields with less by-product formation. The brominating agent can be added directly to the reaction mixture, or some of the recycled solvent mixture can be mixed with the brominating agent, and this brominating solution can be added to the reaction mixture. A preferred method of bromination involves the addition of some of the brominating solvent to the reaction vessel, along with about 10% of the brominating agent to be used. Then, in separate streams, the solution of the adduct to be brominated and the remainder of the brominating agent are added, with agitation. The rate of addition of each stream is regulated so that a slight excess of brominating agent is maintained, up to the finish of the addition of the brominating agent. The resultant mixture is then stirred a few minutes to assure complete reaction.

The brominated adduct, desirably, is insoluble in the reaction mixture and may thus be removed from the mixture, as by filtration. Then the crude brominated compound can be further processed, such as by washing, recrystallization, drying, etc. The mother liquor resulting from the separation of the brominated adduct can then be recycled for use in the step separating the mono-adduct from the mixture of adducts. It has been found advantageous to treat the recycle solvent mixture to remove or reduce the amount of free brominating agent in the solvent mixture. There are various methods known for treating such a liquid to remove the brominating agent, such as by the addition of an unsaturated compound that will combine with the excess brominating agent, will not react with the solvent and will not interfere with either the solvent extraction or the bromination. A typical method is to bubble ethylene into the recycle stream, to remove excess brominating agent. The ethylene dibromide formed is not deleterious. On the other hand, if the ratio of brominating agent to adduct is only slightly in excess of the stoichiometric amount, the solvent mixture can be recycled to the separation step without further purification.

Having described the invention in general, some preferred embodiments are given below. A typical procedure for the complete process is given first, followed by sections that illustate variations that can be carried out in the separate steps.

PREPARATION OF A BROMINATED ADDUCT

A mixture of 136.5 g. (0.5 mole) of hexachlorocyclopentadiene and 486 g. (4.5 moles) of cyclooctadiene-1,5 was heated at 140°–145°C. for 1 hour. Excess cyclooctadiene was removed by atmospheric distillation, with a maximum pot temperature of 200°C., leaving a crude adduct mixture of 190.2 g. This mixture was added to 300 g. of a mixture of 50 wt.% benzene: 50 wt.% t.butyl alcohol, stirred at room temperature for 0.5 hour and filtered, with 15.0 g. of diadduct as an insoluble residue.

Into a flask equipped for bromination was placed 100 g. of a 50:50 wt.% mixture of benzene and t.butyl alcohol Then, with stirring and in separate addition streams was added the mono-adduct solution (containing 175.2 g. of adduct) from the separation step and 77.1 g. (0.483 mole) bromine, over a period of about 0.5 hour. The addition rate was adjusted so that an excess of bromine was present in the flask at all times, up to the completion of the addition of bromine. This excess was noted by the presence of a red-brown color in the reaction mixture. The reaction temperature was maintained at about 25°C. by external cooling. Stirring was continued for about 0.5 hour after completion of the addition of bromine. This excess was noted by the presence of a red-brown color in the reaction mixture. The reaction temperature was maintained at about 25°C. by external cooling. Stirring was continued for about 0.5 hour after completion of addition of the reactants. The mixture was filtered, and the white solid was washed twice with 50 g. amounts of a 50:50 wt. % benzene: t.butyl alcohol mixture, with the washings being added to the first filtrate. The washed product, dried overnight in a vacuum oven at 50°C., weighed 202.4 g. (76%) and had a melting point of 198°–200°C.

The collected filtrate and washings from the above bromination, about 450 g., were recycled for use in another adduct-separation step, as described in the first paragraph of the procedure. Of this amount of recycled solvent, 300 g. were used in the separation, 100 g. were added to the flask prior to bromination, and 50 g. were used as the first wash for the brominated product.

A. Preparation of Adduct Mixture and Separation of Mono-Adduct

EXAMPLE 1

A mixture of 1872 g. (6.85 moles) of hexachlorocyclopentadiene with 6168 g. (59.4 moles) of cyclooctadiene-1,5 was put in a 12 l. glass flask. The mixture was refluxed (140°–144°C.) for 1 hour, and excess cyclooctadiene (4741 g.) was removed by distillation at atmospheric pressure, with a maximum pot temperature of 200°C. The residue was then distilled, over a length of 3 hours, under vacuum, giving, among others, a 1:1 adduct cut of 2137 g. at 153°–213°C./4–5 mm. Hg and residual bottoms. The 1:1 adduct was obtained in about an 82.5% yield, based on hexachlorocyclopentadiene. The melting point of the product was 60°–63°C.

EXAMPLE 2

A mixture of 138.9 g. (0.51 mole) of hexachlorocyclopentadiene and 459 g. (4.4 moles) of cyclooctadiene-1,5 was heated at 140°–144°C. for 1 hr. Excesss cyclooctadiene was removed by distillation at atmospheric pressure (maximum pot temperature=200°C.), leaving a crude adduct mixture weight 191.1 g. This crude mixture was added to 300 ml. heptane and gently agitated at room temperature for 20 minutes. The solution of the monoadduct of hexachlorocyclopentadiene and cyclooctadiene in heptane was separated from the insoluble diadduct by filtration, leaving 15.9 g. of diadduct. The heptane solution contained 175.2 g. of the monoadduct, representing an overall yield of 90.8%, based on hexachlorocyclopentadiene. The melting point of a sample of the white crystalline monoadduct obtained from the heptane solution was 62°–64°C.

EXAMPLE 3

A crude mixture of the 1:1 and 2:1 adduct of hexachlorocyclopentadiene and cyclooctadiene, obtained as in Example II, was mixed with twice its weight of a 50:50 wt.% mixture of benzene:t. butyl alcohol and stirred for 20 minutes. The diadduct was not soluble in the separating solvent and was removed by filtration, resulting in a benzene:butyl alcohol solution of the monoadduct. The melting point of the white powder product obtained from this solution was 62°–64°C.

A similar mixture of the 1:1 and 2:1 adducts, as above, was treated with twice its weight of a 60:40 (wt.%) mixture of benzene:methyl alcohol. Although methyl alcohol has a dielectric constant of more than 30 and is not a suitable selective solvent when used alone, the benzene:methyl alcohol mixture had a dielectric constant of less than 30. The 2:1 adduct was removed, leaving a solution of the monoadduct in benzene:methyl alcohol.

EXAMPLE 4

Using the procedure of Example 2, cyclooctadiene-1,3 was adducted with hexachlorocyclopentadiene, excess cyclooctadiene was removed by atmospheric distillation, and the resultant crude mixture of adducts was distilled under vacuum. The yield of mono-adduct was 81.4%, and the boiling point was 130°–152°C./1 mm.

EXAMPLES 5–19

The examples tabulated below illustrate the selectivity of various solvents in separating 100 g. samples containing 95 wt.% mono- and 5 wt.% di-adduct of the Diels-Alder reaction product of hexachlorocyclopentadiene and cyclooctadiene-1,5. In each case the sample and the indicated quantity of solvent were stirred together for one-half hour at room temperature and then filtered. The indicated amount of insoluble residue, containing the di-adduct and varying quantities of the mono-adduct, shows the general relationship between the dielectric constant of the solvent and its selectivity.

TABLE 1

| Ex. | Solvent (dielectric constant) | Wt. of Solvent (g.) | Wt. of Residue(g.) |
|---|---|---|---|
| 5 | n-heptane (2) | 150 | 8.9 |
| 6 | 38 parts n-heptane (2) 62 parts t.butyl alcohol (11) | 200 | 7.9 |
| 7 | methylene chloride (9) | 100 | 8.3 |
| 8 | dioxane (2) | 150 | 7.2 |
| 9 | diethylene glycol dimethyl ether (5–10) | 200 | 7.4 |
| 10 | ethylene glycol (38) | 385 | 70 |
| 11 | nitromethane (36) | 505 | 69 |
| 12 | nitroethane (28) | 250 | 10.5 |
| 13 | nitropropane (23) | 150 | 10.0 |
| 14 | methyl cyanide (38) | 300 | 66 |
| 15 | propionitrile (27) | 150 | 9.2 |
| 16 | chloroform (5) | 100 | 10.8 |
| 17 | methyl chloroform | 150 | 8.2 |
| 18 | n-propyl bromide | 150 | 7.5 |
| 19 | 50 parts carbon tetrachloride 50 parts t.butyl alcohol | 200 | 9.8 |

B. Bromination of Mono-Adduct

EXAMPLE 20

Into a 500 ml. four-necked flask outfitted with a thermometer, a mechanical stirrer and two dropping funnels was placed 100 ml. of t.butyl alcohol. The stirrer was started (350 rpm) and 133 ml. of heptane solution containing 76.2 g. (0.2 mole) monoadduct (a portion of the solution of Example 2) was added simultaneously with 32.8 g. (0.205 mole) bromine over a period of about 0.5 hour. Addition rate was adjusted so that an excess of bromine was maintained in the reaction flask at all times. Temperature was maintained at 25°C. by external cooling. After completion of addition, stirring was continued for 15 minutes and then 2.0 g. sodium carbonate was added; stirring was continued for an additional 0.5 hour. The mixture was filtered and the resulting white solid was washed on the filter three times with 50 ml. isopropyl alcohol. The product was dried in the vacuum oven at 50°. There was obtained 80.7 g. (74.6%), m. p. 190°– 193°C., decomposition point darkening at 225°, bubbling at 252°. Recrystallization of 10 g. of the crude reaction product from 30 ml. chloroform gave 6.5 g., m. p. 201°–203°, darkening at 253°.

EXAMPLES 21–37

Using the procedure of Example 20, the following brominations were carried out. The reaction temperature was 25°C., with simultaneous addition of $Br_2$ and the solution of the adduct, with an excess of bromine maintained. A portion of the solvent used in dissolving the adduct was added to the reaction flask prior to bromination.

TABLE 2

EVALUATION OF SOLVENTS IN BROMINATION OF THE MONO-ADDUCT OF CYCLOOCTADIENE-1,5 AND HEXABROMOCYCLOPENTADIENE

| Example | Solvent | % Yield Brominated Adduct | M.P. (°C.), Brominated Adduct |
|---|---|---|---|
| 21 | n-heptane | 90.7 | 195–198 |
| 22 | 38 parts n-heptane 62 parts t.butyl alcohol | 92.6 | 196–199 |
| 23 | methylene chloride | 81.0 | 199–201 |
| 24 | chloroform | 75.3 | 199–201 |
| 25 | carbon tetrachloride | 79.2 | 197–199 |
| 26 | methyl chloroform | 80.1 | 198–200 |
| 27 | ethylidene dichloride | 82.4 | 199–201 |
| 28 | n-propyl bromide | 45.5 | 199–201 |
| 29 | propionitrile | 46.1 | 197–198 |
| 30 | nitroethane | 87.3 | 197–200 |
| 31 | 1-nitropropane | 87.3 | 198–201 |
| 32 | dioxane | 70.1 | 198–200 |
| 33 | 50 parts of chloroform 50 parts t.butyl alcohol | 86.8 | 199–202 |
| 34 | 50 parts methyl chloroform 50 parts t. butyl alcohol | 86.8 | 199–200 |
| 35 | 50 parts carbon tetrachloride 50 parts t.butyl alcohol (a) | 69.2 | 199–200 |
| 37 | 63 parts benzene 37 parts t.butyl alcohol | 78.8 | 200–201 |

(a) Reaction temperature = 75°C.

C. Recycle of Solvent System

EXAMPLE 38

A crude mixture of the mono- and di-adduct of cyclooctadiene-1,5 and hexachlorocyclopentadiene (100 g., approximately 95% mono-adduct and 5% di-adduct) was charged to a reaction vessel, along with 150 g. of the filtrate from a previous bromination, the filtrate having the approximate composition of 63 wt.% benzene and 37 wt.% t.butyl alcohol. This mixture was stirred (350 rpm) for 1 hour at room temperature, allowed to settle for 5 minutes, and filtered, resulting in 8.5 g. insolubles.

Into a clean reaction vessel containing 100 ml. of a 63:37 wt.% mixture of benzene-t.butyl alcohol was added, in separate streams, 0.205 mole of bromine and a quantity of the filtrate containing 0.2 mole of the mono-adduct. The addition required 12 minutes, the reaction temperature was 50°C., and a slight red-brown color, indicating an excess of bromine, was maintained until all the bromine had been added. The resultant mixture was then stirred an additional 15 minutes, allowed to settle for 5 minutes and filtered, using suction, through a coarse, fritted glass Buchner funnel. The product was washed first with a mixture of 37 ml. of the filtrate from a previous bromination (as used in the separation of the above adduct mixture) and 23 ml. of fresh solvent, with the wash solvent having the 63:37 ratio of benzene:t.butyl alcohol. The product was washed a second time with 60 ml. of fresh solvent (63:37 benzene:t.butyl alcohol).

The product, dried overnight in a vacuum oven at 50°C. consisted of fine, white crystals, weighed 97.2 g. and had a melting point of 199°–200°C.

Similar experiments, using the same adduct mixture and extraction-bromination solvent as above, were made to prove the worth of recycling the solvent system. The data below show the yields and melting points for the products obtained.

| Cycle | % Yield of Brominated Adduct | M.P. (°C.) |
|---|---|---|
| 1 | 78.8 | 200–201 |
| 2 | 89.8 | 199–200 |
| 3 | 90.5 | 199–200 |
| 4 | 90.7 | 199–201 |

Using procedures similar to those given above, a 67:33 wt.% mixture of benzene:isopropyl alcohol was used as the solvent system. Recycle data, with bromination done at 25°C., is as follows:

| Cycle | % Yield | M.P. (°C.) |
|---|---|---|
| 1 | 57 | 199–201 |
| 2 | 83 | 198–201 |

When the bromination similar to that above was carried out at 50°C., the recycle data shows

| Cycle | % Yield | M.P. (°C.) |
|---|---|---|
| 1 | 47 | 200–203 |
| 2 | 81 | 200–203 |

Results similar to those given above are obtained when
a. Methyl chloroform is the solvent system
b. Methylene chloride is the solvent system
c. 1-Nitropropane is the solvent system
d. One-half of the combined filtrate plus washings from a bromination was treated by bubbling ethylene gas through the liquid for 10 minutes, combined with the untreated one-half of the filtrate plus washings, and recycled through the separation and bromination steps.

While the present invention has been described herein with reference to particular embodiments thereof, it will be appreciated by those skilled in the art that various changes and modifications can be made without departing from the scope of the invention.

We claim:

1. In a process for preparing a brominated fire retarding agent having the hexachlorocyclopentadiene structure

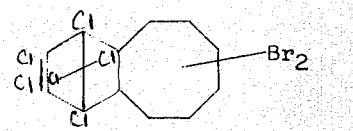

comprising, in sequence, the steps of
a. reacting hexachlorocyclopentadiene with at least a stoichiometric amount of cyclooctadiene,
b. extracting, from the mixture of mono-adducts and di-adducts formed in step (a), the mono-adduct with a selective liquid organic solvent having a dielectric constant of less than about 30 and being chemically non-reactive toward the adducts,
c. brominating the extracted mono-adduct with at least a stoichiometric amount of bromine, and
d. separating the brominated adduct formed in step (c), the improvement consisting of
A. performing the bromination step using the solvent system employed in extraction step (b) and
B. separating the brominated adduct from the solvent system and recycling the separated solvent for use in extraction step (b).

2. The process according to claim 1 in which the solvent from the bromination step is treated to reduce the concentration of brominating agent before recycling to the extraction step, by adding an unsaturated compound that combines with the excess bromine, does not react with the solvent, and does not interfere with either the solvent extraction or the bromination.

3. The process according to claim 1 in which the bromination is conducted under conditions wherein an excess of bromine is present in the reaction mixture.

4. The process according to claim 3 in which the amount of bromine used varies from stoichiometric to about 10 weight percent excess.

* * * * *

UNITED STATES PATENT OFFICE
CERTIFICATE OF CORRECTION

Patent No. 3,922,316      Dated November 25, 1975

Inventor(s) John Versnel and Lionel T. Wolford

It is certified that error appears in the above-identified patent and that said Letters Patent are hereby corrected as shown below:

Page 1, left hand column, line 5, the Assignee should read -- Cities Service Company--.

Signed and Sealed this twenty-third Day of March 1976

[SEAL]

Attest:

RUTH C. MASON
*Attesting Officer*

C. MARSHALL DANN
*Commissioner of Patents and Trademarks*